United States Patent
Condrey

[11] Patent Number: 5,853,153
[45] Date of Patent: Dec. 29, 1998

[54] CAMERA FLOAT DEVICE

[76] Inventor: Robert L. Condrey, 7905 Brockwood Way, Citrus Heights, Calif. 95621

[21] Appl. No.: 841,931

[22] Filed: Apr. 8, 1997

[51] Int. Cl.[6] .......................................................... A47F 5/00
[52] U.S. Cl. ......................................... 248/125.2; 396/428
[58] Field of Search .............................. 248/123.2, 125.2, 248/276.1, 281.1, 284.1, 291.1, 292.12; 352/90; 396/419, 428

[56] References Cited

U.S. PATENT DOCUMENTS

| | | | |
|---|---|---|---|
| 2,326,657 | 8/1943 | Johnston | 396/428 |
| 2,461,058 | 2/1949 | Houston | 248/125.2 |
| 4,655,567 | 4/1987 | Morley . | |
| 4,657,220 | 4/1987 | Lindsay | 396/428 |
| 5,150,627 | 9/1992 | Lindsay | 396/428 |
| 5,218,876 | 6/1993 | Lindsay | 396/428 |
| 5,435,515 | 7/1995 | DiGiulio et al. | 396/428 |
| 5,538,214 | 7/1996 | Sinila | 248/284.1 |

OTHER PUBLICATIONS

A&C "Powerpod" Brochure.
Steadi–Cam Brochure.

*Primary Examiner*—Ramon O. Ramirez
*Assistant Examiner*—Robert Lipcsik
*Attorney, Agent, or Firm*—John P. Costello

[57] ABSTRACT

A manually operated camera float device for achieving movement-free video camera shots. This device attaches to a camera boom and is comprised of a first frame member and a second frame member, the first frame member having a platform for coupling a camera upon. The second frame member rotatably couples to the camera boom and the first frame member rotates in a swinging arc in relation to the second frame member. The first frame member rotates as a result of a system of pulleys communicating by a drive belt, in a first embodiment. In a second embodiment, a system of tie rods allows the first frame member to rotate. In a third embodiment a system of gears allow rotation of the first frame member. In operation, the camera float device operates in conjunction with a camera boom for allowing the camera to be floated in a three-dimensional environment through simple manual manipulation. Additionally, an entire filming system is disclosed which is comprised of the camera float device, the camera boom, a camera dolly, and pedestal.

9 Claims, 5 Drawing Sheets

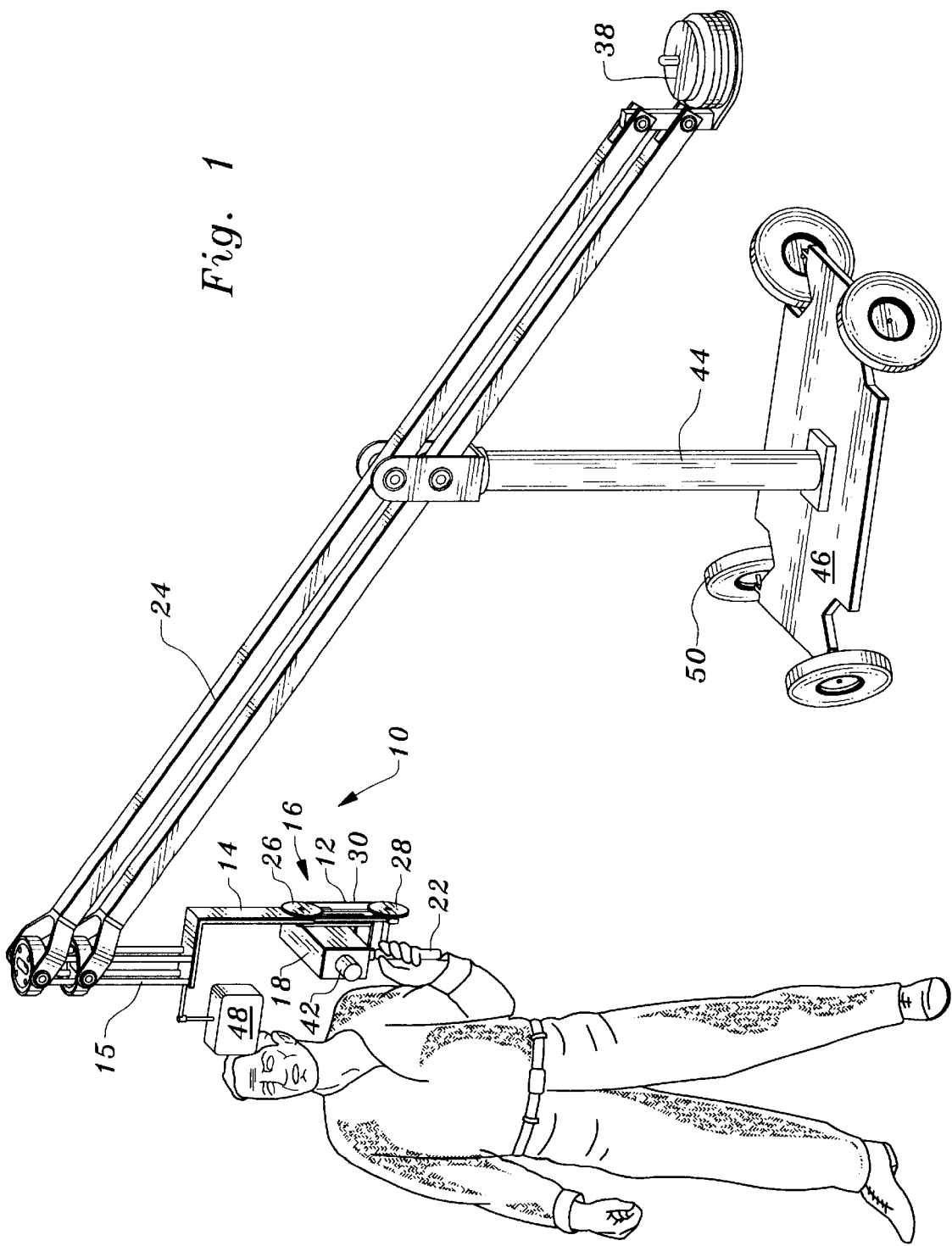

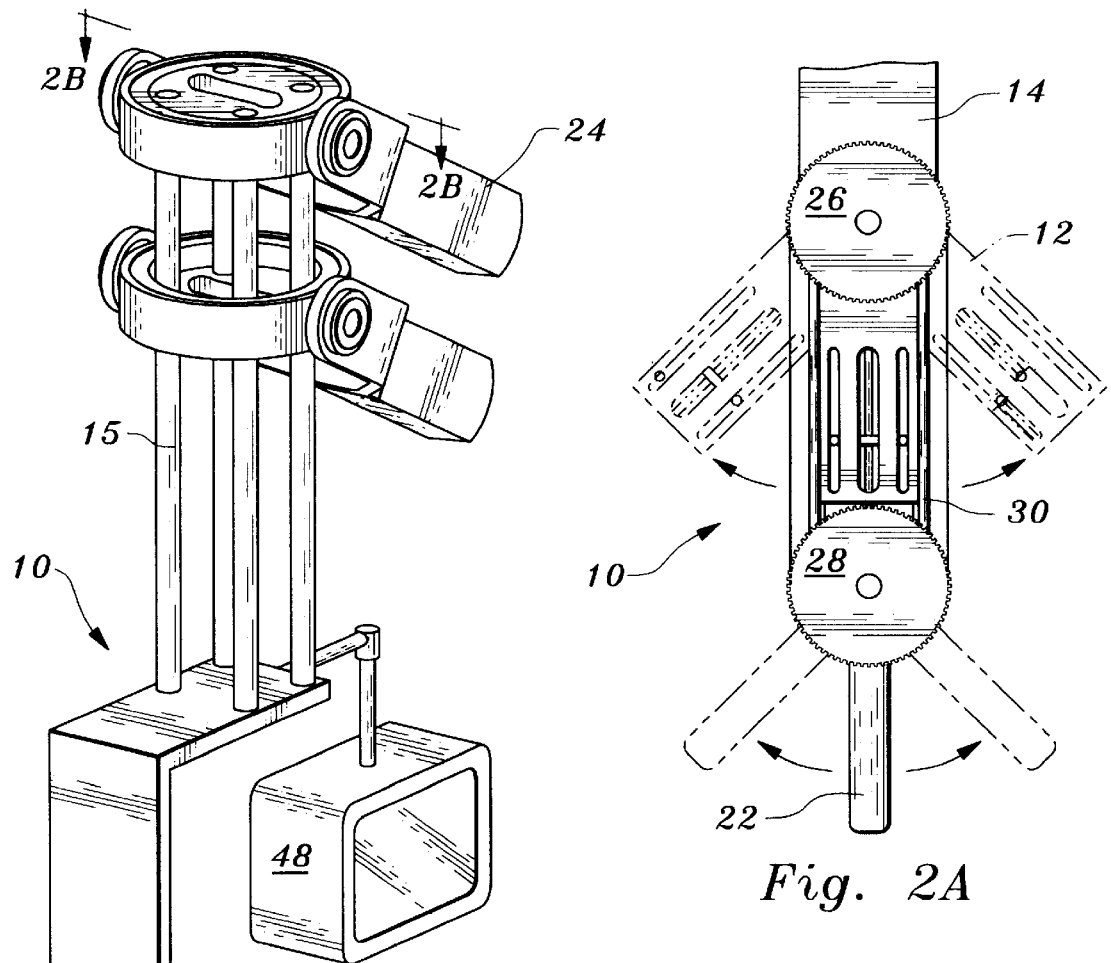
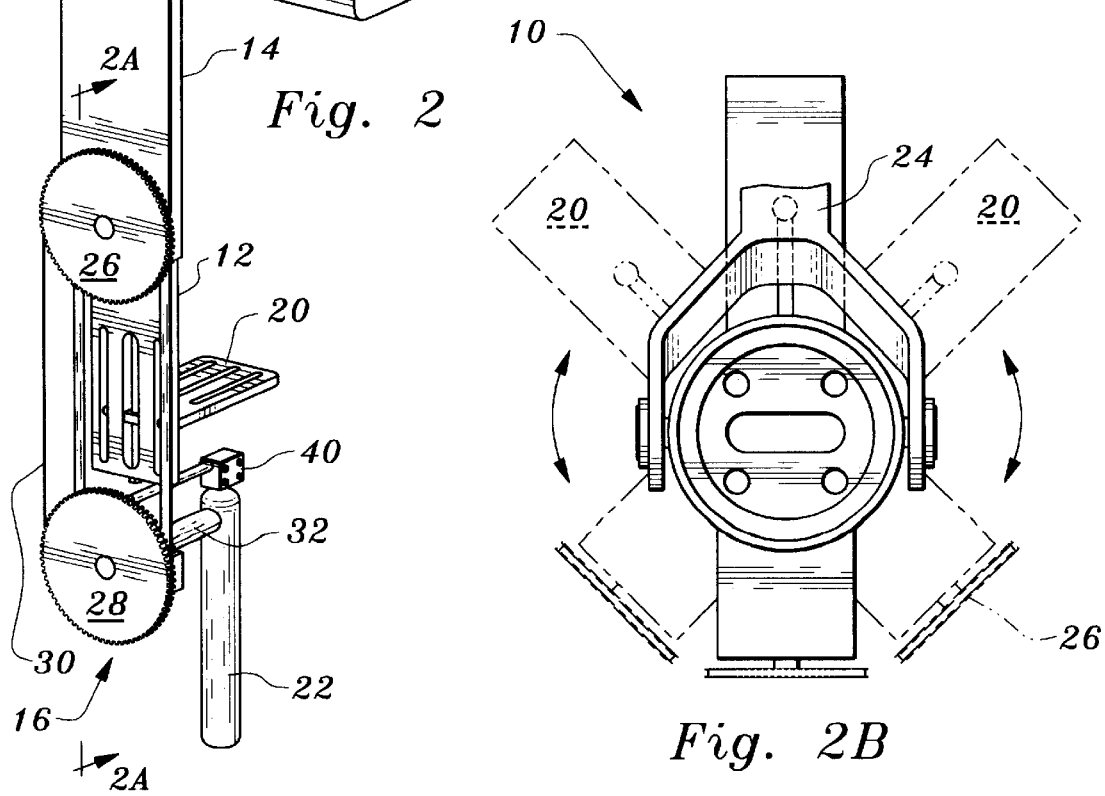

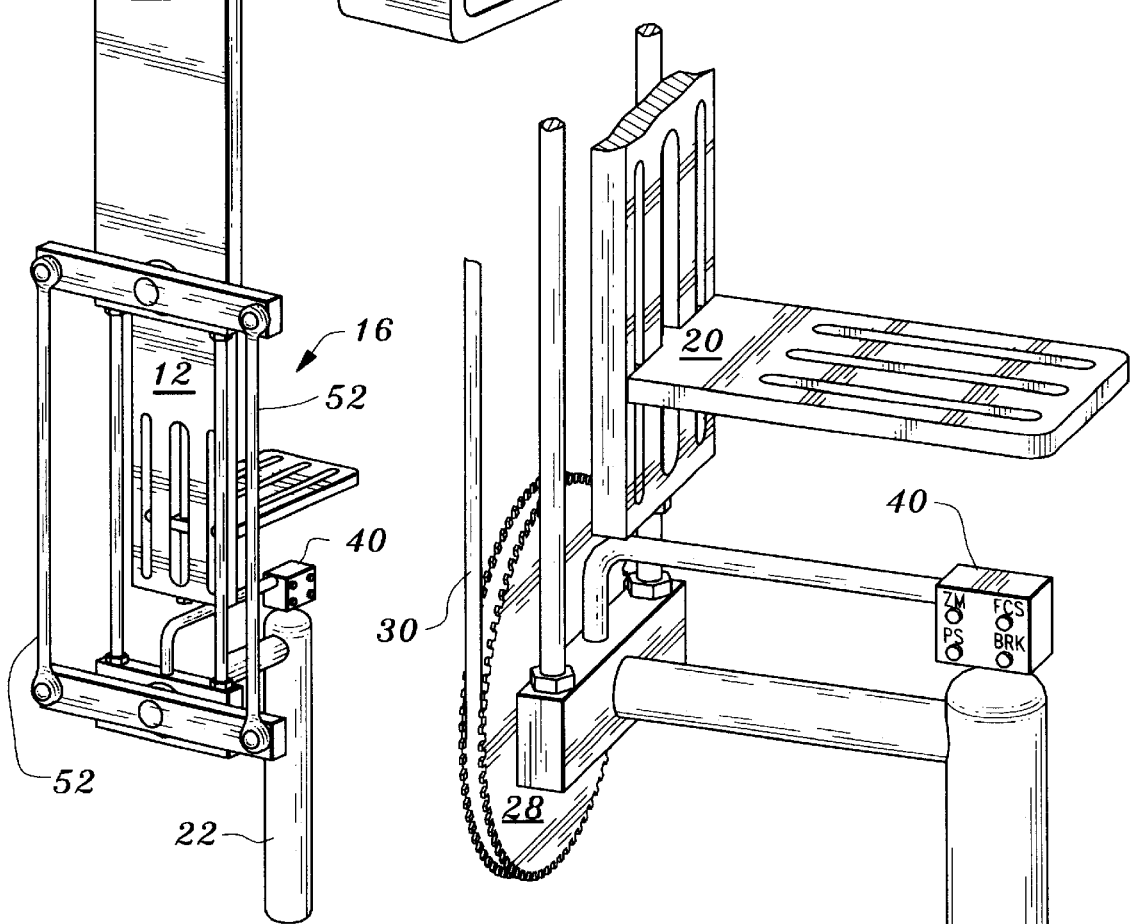

CAMERA FLOAT DEVICE

BACKGROUND OF THE INVENTION

1. Field of the Invention

This invention pertains to production camera equipment, and, more specifically, to a device for obtaining steady floating camera shots during filming.

2. Description of the Background Art

During the filming of a video production, it is crucial that all the shots taken with camera equipment be steady, so that perceptive movement is not visible in the final film product. Undesired camera movement is commonly seen in amateur film and video productions and, hence, the lack of movement is a signature of a quality professional production.

A myriad of equipment has been devised to combat the problem of undesired camera movement. The most successful solution to date has been the development of a device called the STEADICAM®. The STEADICAM® is in wide use, currently, and is comprised of a pedestal having a platform for mounting a camera, the pedestal being coupled to a body harness worn by the operator. The body harness allows the STEADICAM® operator to manipulate the camera in three dimensions, using complex body movements. The three dimensions, or planes capable of manipulation by the STEADICAM® operator are as follows: (1) a tilting, or up-down plane; (2) a panning, or side-side plane; and (3) a front-back plane, for getting closer to, or further from, a film subject. With proper training and body positioning, the STEADICAM® operator can "float" camera shots in all three dimensions, simultaneously, in such a manner that no perceptible camera movement is seen to occur.

The STEADICAM® is typically a difficult piece of equipment to operate, because the operator must be capable of positioning the STEADICAM® simultaneously in the three axes previously described. The athleticism of the STEADICAM® operator is manifested in his/her ability to maintain steady, floating shots in this three dimensional environment. Due to their unique abilities, STEADICAM® operators are highly paid, and additionally, STEADICAM® equipment is sold only to licensed operators. The complexity in operating the STEADICAM®, coupled with its limited market of licensees, are factors which require the STEADICAM® to be priced at a level which is not affordable to the average small production company.

Also, because the videographer who sets up the shots cannot operate the STEADICAM® himself, the STEADICAM® operator must act on the videographer's instructions, second hand. Therefore, the STEADICAM® operator, not the videographer, is ultimately responsible for the quality of shots. Because the operation of the camera by the STEADICAM® operator is once-removed from the videographer, the final product often does not meet the quality standards of the videographer, and shots have to be repeated. This repetition of "takes" constitutes a waste of film and movie crew time, correspondingly resulting in increased production costs.

Alternatively, an electro-mechanical solution to manipulating a camera in three dimensions is shown in U.S. Pat. No. 4,655,567, issued to Morley. This patent discloses a remote panning and tilting mount for video cameras. The operator can manipulate a set of remote controls to make the camera pan, tilt and rock between various three-dimensional positionings.

Another electro-mechanical device for achieving steady shots in three dimensions is the POWERPOD™ which is the subject of U.S. Pat. No. 4,779,833. This device allows a camera to be hung from a camera boom and manipulated by remote control means.

A disadvantage with the electro-mechanical solutions previously referenced, are that precise shots require the fine motor skills of a videographer or camera operator, as these individuals must be able to "feel" these precise shots. Therefore, while electro-mechanical camera mounts are adequate for capturing general video shots, they fall short when attempts are made to achieve precise, artistic, shots; these shots requiring the fine manual input of the camera operator or videographer.

A need therefore exists for an inexpensive device capable of achieving steady, movement-free, professional shots, through manual manipulation. Additionally, it is preferable for such a device to be so simplistic as to be capable of manipulation by the videographer, thereby removing highly trained individuals such as the STEADICAM® operator from the shot process. Removing these camera middlemen would allow the videographer to be responsible for taking the shots, thereby finally placing the artist rightfully behind the camera. Additionally, by removing highly trained middlemen from the shot process, the costs of video production would be correspondingly reduced.

The foregoing patents and other information reflect the state of the art of which the inventor is aware and are tendered with a view toward discharging the inventor's acknowledged duty of candor in disclosing information which may be pertinent to the patentability of the present invention. It is respectfully stipulated, however, that the foregoing patents and other information does not teach or render obvious, singly or when considered in combination, the inventor's claimed invention.

SUMMARY OF THE INVENTION

By way of example and not of limitation, the present invention pertains to a manual camera float device of simple design and operation, which allows steady, movement-free, shots to be achieved, by an individual having minimal training. In a first embodiment of the device, a first frame member has a camera platform for placing a camera thereon, wherein the first frame member rotates in a swinging arc in relation to a second frame member, the second frame member being rotatably coupled to a camera boom.

In the first embodiment, the rotating ability of the first frame member allows the camera to tilt up and down. Rotation is allowed through a rotation means which is comprised, in the preferred embodiment, of a system of pulleys joined by one or more drive belts. A handle means is joined to one of the pulleys for purposes of applying hand pressure for causing the first frame member to rotate. Additionally, applying an axial rotation to the handle means allows the float device to rotate in a panning arc. Finally, the camera can be manipulated in a front to back axis by moving the device closer to or away from a camera subject, in conjunction with the camera boom.

In a second embodiment of the float device, the rotation means is comprised of a tie rod mechanism which joins the first frame member with the handle means. In a third embodiment of the invention, the rotation means is comprised of a system of gears. In a fourth embodiment, the float device is mounted above the camera boom, rather than below it, for allowing the videographer to take high elevation shots.

This camera float device is most useful when incorporated into an entire system comprised of the float device, a dolly, a pedestal, and a camera boom. Consequently, the following objects and advantages are to be achieved by this invention:

An object of the invention is to provide a manual camera float device capable of operation by an individual with minimal training.

Another object of the invention is to provide a manual camera float device capable of providing movement-free shots.

Another object of the invention is to provide a camera float device that is inexpensive to purchase and operate, thereby allowing small production companies to own camera float equipment.

Still another object of the invention is to provide a camera float device which can be operated by a videographer, thereby placing the videographer in charge of the film process.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is an elevated perspective view of the first embodiment of the camera float device with a camera coupled thereto and accompanying camera boom, dolly, and pedestal.

FIG. 2 is a closeup perspective view of the first embodiment of the camera float device which is the present invention, shown coupled to a cutaway portion of a camera boom.

FIG. 2A is a side view taken through line 2A in FIG. 2, showing the front-back back articulation of handle means and the corresponding tilting movement of first frame member FIG. 2B is a top view taken through line 2B in PIG. 2, showing the side-side articulation of handle means resulting in a corresponding panning movement of the float device in relation to the camera boom.

FIG. 4 is a closeup perspective view of the handle means component of the invention showing a built-in camera lens control feature.

FIG. 5 is a closeup perspective view of a second embodiment of the camera float device which is the present invention, shown coupled to a cutaway portion of the camera boom.

DESCRIPTION OF THE PREFERRED EMBODIMENTS

Figure 3:
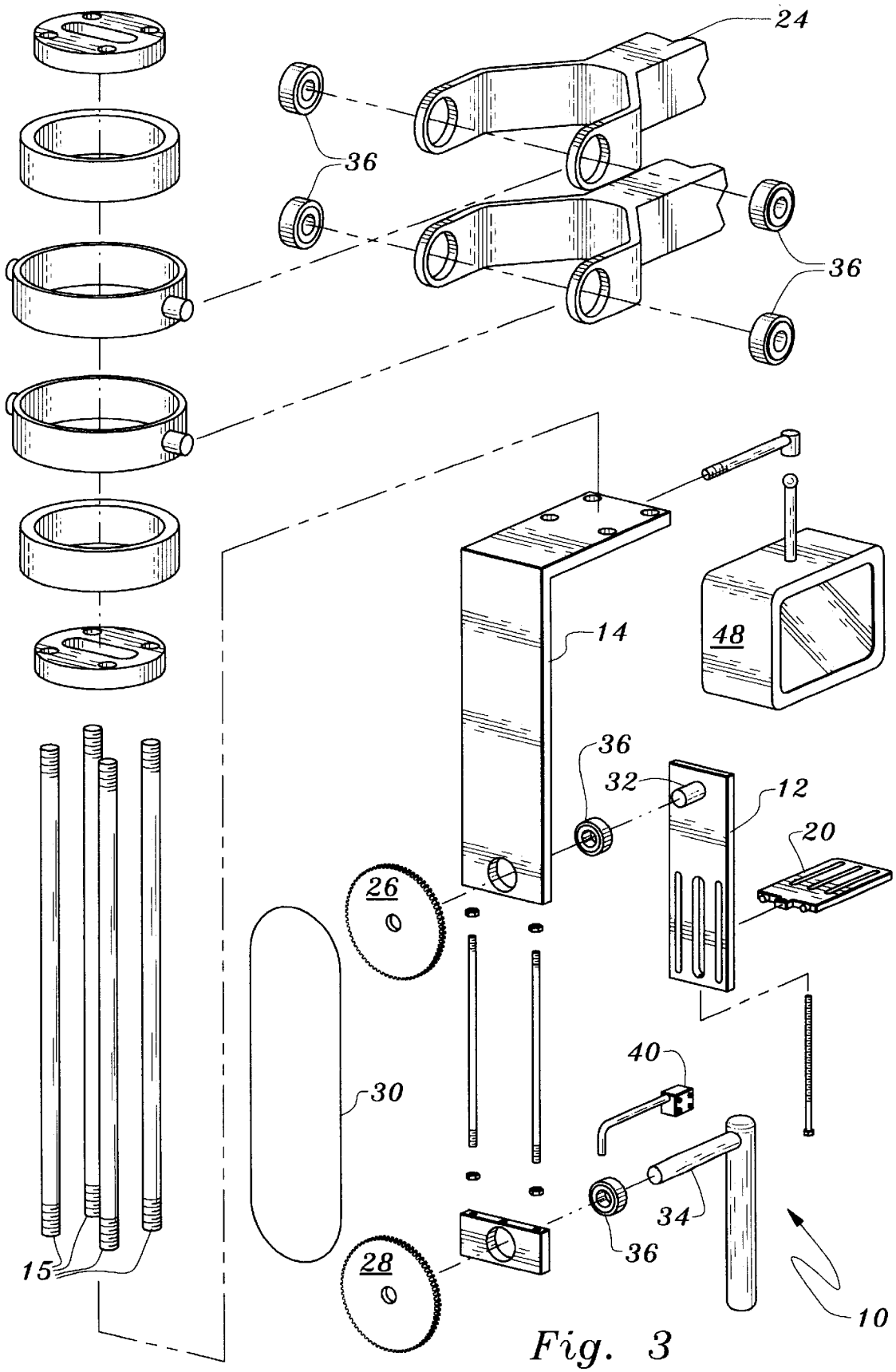
FIG. 3 is an exploded view of the first preferred embodiment of the camera float device.

Referring more specifically to the drawings, the camera float device which is the present invention is generally shown attached to camera boom, dolly and pedestal in FIG. 1. It will be appreciated that camera float device 10 may vary as to configuration and as to details of the parts without departing from the basic concepts as disclosed herein.

FIGS. 1–4 illustrate the first preferred embodiment of camera float device 10, which is comprised of first frame member 12, a second frame member 14, and a rotation means 16. As seen most clearly in FIG. 2A, first frame member 12 rotates in a swinging arc in relation to second frame member 14, this arc allowing camera 18 to achieve movement in a tilting plane. Second frame member 14 is suspended from a means 15 for coupling float device 10 to camera boom 24. Means 15 shown in the drawings is a system of rods and couplers commonly available, but any means 15 capable of suspending second frame member 14 from camera boom 24 can be used. Camera 18 is mounted on camera platform 20 which is attached to first frame member 12. Handle means 22, which is coupled to rotation means 16 allows a user to rotate first frame member 12 with simple, manual hand pressure. As shown in FIG. 2A, placing forward or backward hand pressure on handle means 22 creates movement in the tilting plane just described. Axial rotation of float device 10 is accomplished by using appropriate manual pressure on handle means 22, as shown in FIG. 2B, thereby causing float device 10 to rotate in a panning arc. Handle means 22 is positioned in a centered relation upon float device 10 so as to enhance the balanced "feel" of device 10 upon moving handle means in the manner shown in FIGS. 2A and 2B.

FIG. 3 illustrates an exploded view of the preferred embodiment of camera float device 10, this embodiment having rotation means 16 comprised of first and second pulleys 26, 28 communicating through drive belt 30. First pulley 26 is coupled via shaft 32 to first frame member 12 and second pulley 28 is coupled to handle means 22 via shaft 34. Applying hand pressure to handle means 22 as previously described, causes camera float device 10 to operate in a three-dimensional manner. The application of hand pressure to handle means 22 causes second pulley 28 to rotate, which in turn rotates first pulley 26, causing first frame member 12 to move in a swinging arc. Shafts 32, 34 rotate within sealed bearings 36. Additionally, sealed bearings 36 are preferably used throughout camera float device 10 at all points of rotation. Pulleys 26, 28 rotate in the smoothest manner if they are of equivalent size or ratio, and if they are in direct perpendicular alignment with each other. The combination of pulleys, drive belt, and sealed bearings allows float device to operate in an extremely smooth and movement-free manner.

The smooth operation of float device 10 when coupled to camera boom 24, creates the floating shots so important to this invention. Boom 24 is counterbalanced by weights 38, and it likewise moves in a fluid, movement-free manner. Upon coupling float device 10 to camera boom 24, a videographer or cameraman can easily achieve floating shots with minimal practice or training. Camera boom 24 supports float device 10 and thereby relieves the operator from having to simultaneously support camera 18 in all the planes present in a three-dimensional environment, as is the case with a STEADICAM®, or similar device. Additionally, camera float device 10 allows the videographer to manually operate camera 18 in a floating manner, thereby allowing the videographer to "feel" each shot. The ability of a videographer to directly control the content and artistic quality of a production is a great advantage presented by camera float device 10.

FIG. 4 is a closeup perspective view of handle means 22 which preferably includes a lens control means 40 for zooming and focusing lens 42 upon camera 18. Lens control means 40 is not new to the art, however its adaption to a camera float device 10 increases its utility. Many commercially available lens control means well known in this art such as those manufactured by FUJINON® and CANON® will suffice for usage with this invention.

Referring again to FIG. 1, the integration of camera float device 10 with an entire filming system comprised of boom 24, pedestal 44, and dolly 46 is shown. Monitor 48 can be an add-on accessory to allow the videographer to easily view each shot. Monitor 48 is wired into camera 18 by means well known in this art. Weights 38 can be added to, or removed from, the end of camera boom 24, depending on the weight presented by device, camera and monitor. Finally, a dolly 46 with four locking casters 50 is preferred for stability.

Figure 6:
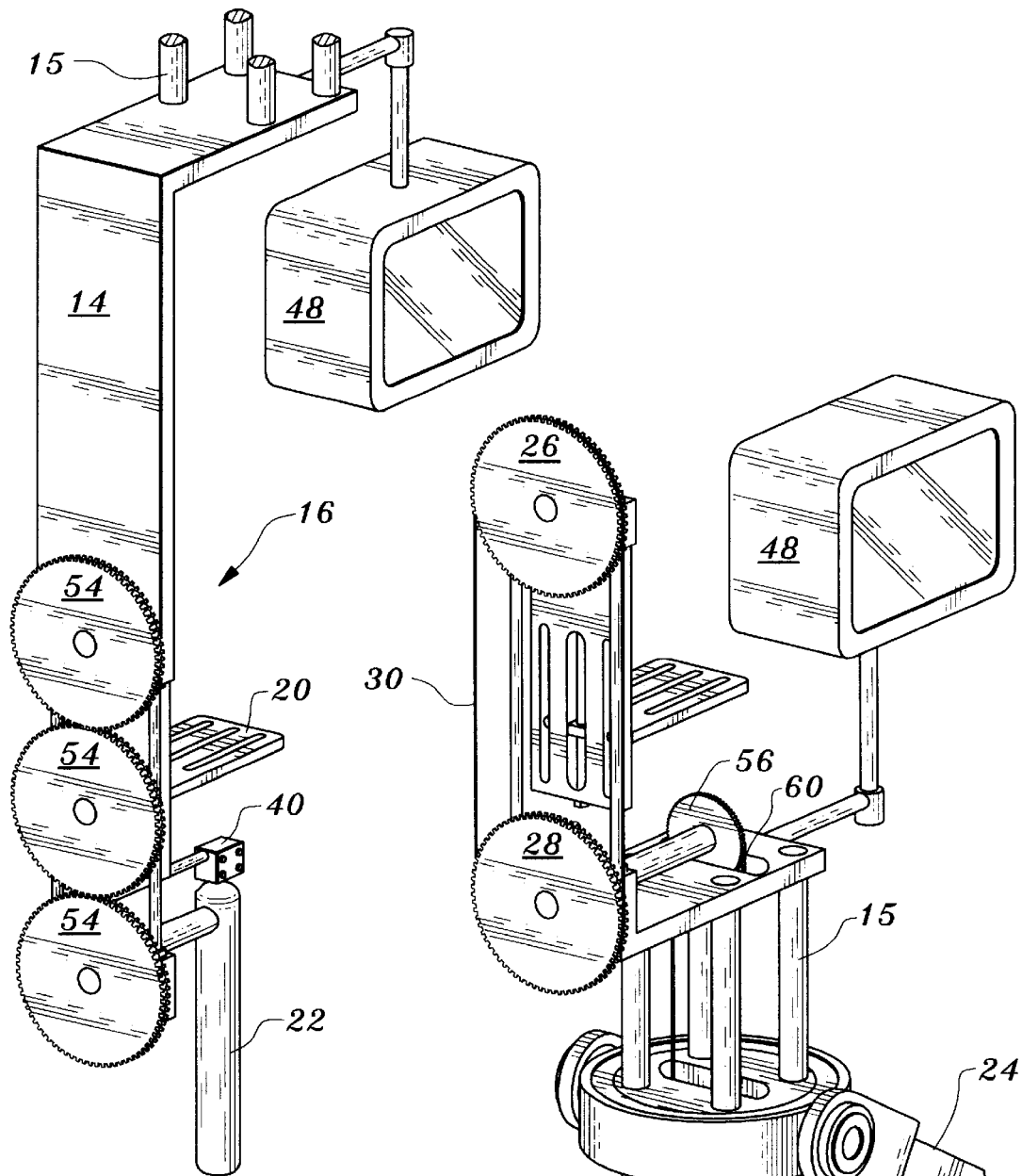
FIG. 6 is a closeup perspective view of a third embodiment of the camera float device which is the present invention, show coupled to a cutaway portion of the camera boom.

FIG. 5 illustrates a second embodiment of the invention wherein rotation means 16 is a tie rod assembly 52, the rotation of handle means 22 causing corresponding movement in tie rod assembly 52 and first frame member 12. FIG. 6 illustrates a third embodiment of the invention wherein rotation means 16 is a system of gears 54.

Figure 7:
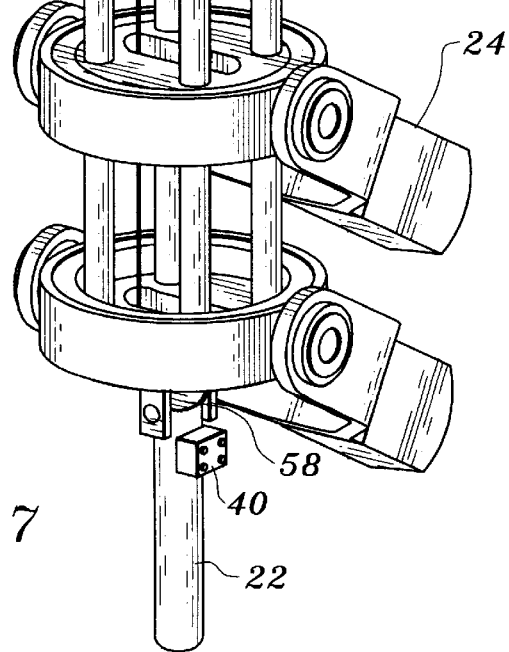
FIG. 7 is a perspective view of a fourth embodiment of the camera float device shown adapted for mounting above the camera boom for purposes of achieving high elevation shots.

FIG. 7 illustrates a fourth embodiment of the invention, wherein float device 10 is adapted for mounting above, rather than below, camera boom 24. This embodiment allows a videographer or cameraman to obtain high elevation shots. This embodiment is shown with a pulley-type rotation means, comprised of pulleys 26, 28, 56, 58 and drive belts 30 and 60. Additionally, a tie-rod rotation means or a gear rotation means could be adapted for use above camera boom 24, as well.

Finally, although the description above contains many specificities, these should not be construed as limiting the scope of the invention, but as merely providing illustrations of some of the presently preferred embodiments of this invention. Thus the scope of this invention should be determined by the appended claims and their legal equivalents.

I claim:

1. A device for floating a camera upon a camera boom, the device comprising:
  a) a first frame member and a second frame member, said first frame member rotatable in relation to said second frame member, said second frame member having means for coupling to a camera boom for allowing said device to float in a three dimensional plane, said first frame member coupled to a platform means for mounting a camera, said platform means for allowing a camera to rotate simultaneously with said first frame member; and
  b) rotation means for rotating said first frame member in relation to said second frame member, said rotation means coupled at a first location to said first frame member, said rotation means coupled at a second location to a handle means, said handle means for applying hand pressure to said rotation means to cause said first frame member to rotate in a swinging arc, wherein said handle means cause said device to rotate in a panning motion, said handle means for additionally causes said device to float in a three dimensional plane upon a camera boom.

2. The device as recited in claim 1, wherein said handle means further comprises a lens control means for controlling a lens on said camera.

3. The device as recited in claim 1, wherein said rotation means further comprises a first pulley coupled to said first frame member by a first shaft and a second pulley coupled to said handle means by a second shaft, said first and second pulleys communicated through a drive belt wherein movement of said handle means is communicated to said first and second pulleys by said drive belt, said first frame member correspondingly rotating upon movement of said handle means.

4. The device as recited in claim 1, wherein said rotation means is comprised of a system of gears.

5. The device as recited in claim 1, wherein said rotation means comprises a tie-rod mechanism.

6. The device as recited in claim 1, wherein said device is adapted for positioning above said camera boom.

7. A device for floating a camera upon a camera boom, the device comprising:
  a) A first frame member and a second frame member, said first frame member rotatable in relation to said second frame member, said second frame member having means for coupling to a camera boom, said first frame member including platform means for mounting a camera and allowing a camera to rotate simultaneously with said first frame member; and
  b) a first pulley coupled to said first frame member and a second pulley coupled to a handle means, said second pulley in perpendicular alignment with said first pulley, said first and second pulleys communicating through a drive belt, said handle means for applying hand pressure and causing simultaneous movement of said first and second pulleys and said first frame member, said first frame member rotating in a swinging arc, wherein said handle means causes said device to rotate in a panning motion upon a camera boom, said handle means further causes said device to float in a three dimensional plane upon a camera boom.

8. A system for achieving floating camera shots through simple manual manipulation, the system comprising:
  a) a camera dolly and pedestal;
  b) a camera boom, said boom mounted upon said pedestal; and
  c) a manually operated camera float device, the device comprising:
    i) a first frame member and a second frame member, said first frame member rotatable in relation to said second frame member, said second frame member having means for coupling to said camera boom for allowing said device to float in a three dimensional plane, said first frame member coupling to a platform means for mounting a camera, said platform means for allowing a camera to rotate simultaneously with said first frame member; and
    ii) rotation means for rotating said first frame member in relation to said second frame member, said rotation means coupled at a first location to said first frame member, said rotation means coupled at a second location to a handle means, said handle means for applying hand pressure to said rotation means to firstly cause said first frame member to rotate in a swinging arc, wherein said handle means causes said device to rotate in a panning motion, said handle means further causes said device to float in a three dimensional plane upon said camera boom.

9. The system as recited in claim 8, further comprising a camera monitor coupled to said system.

* * * * *